Figure 1:
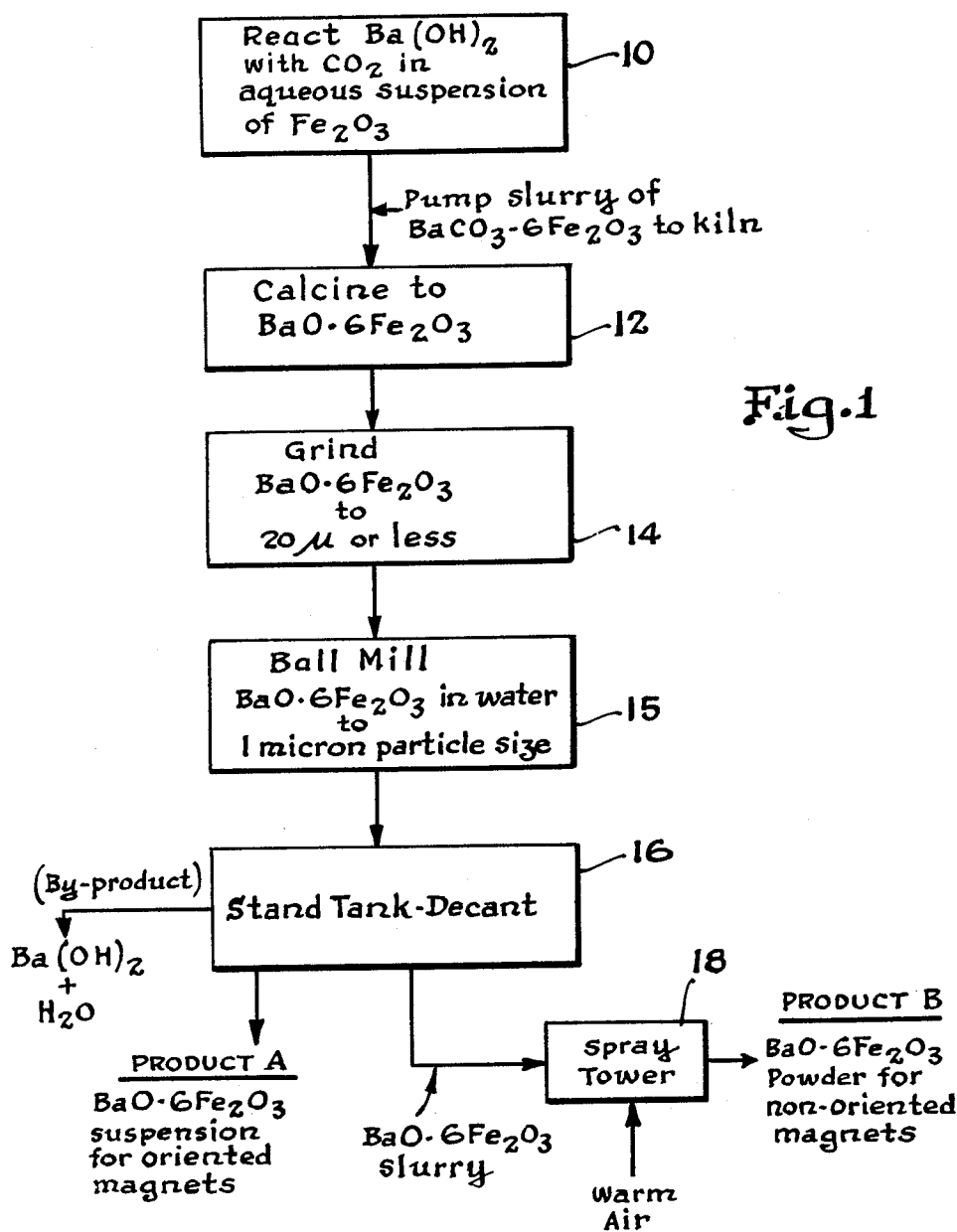

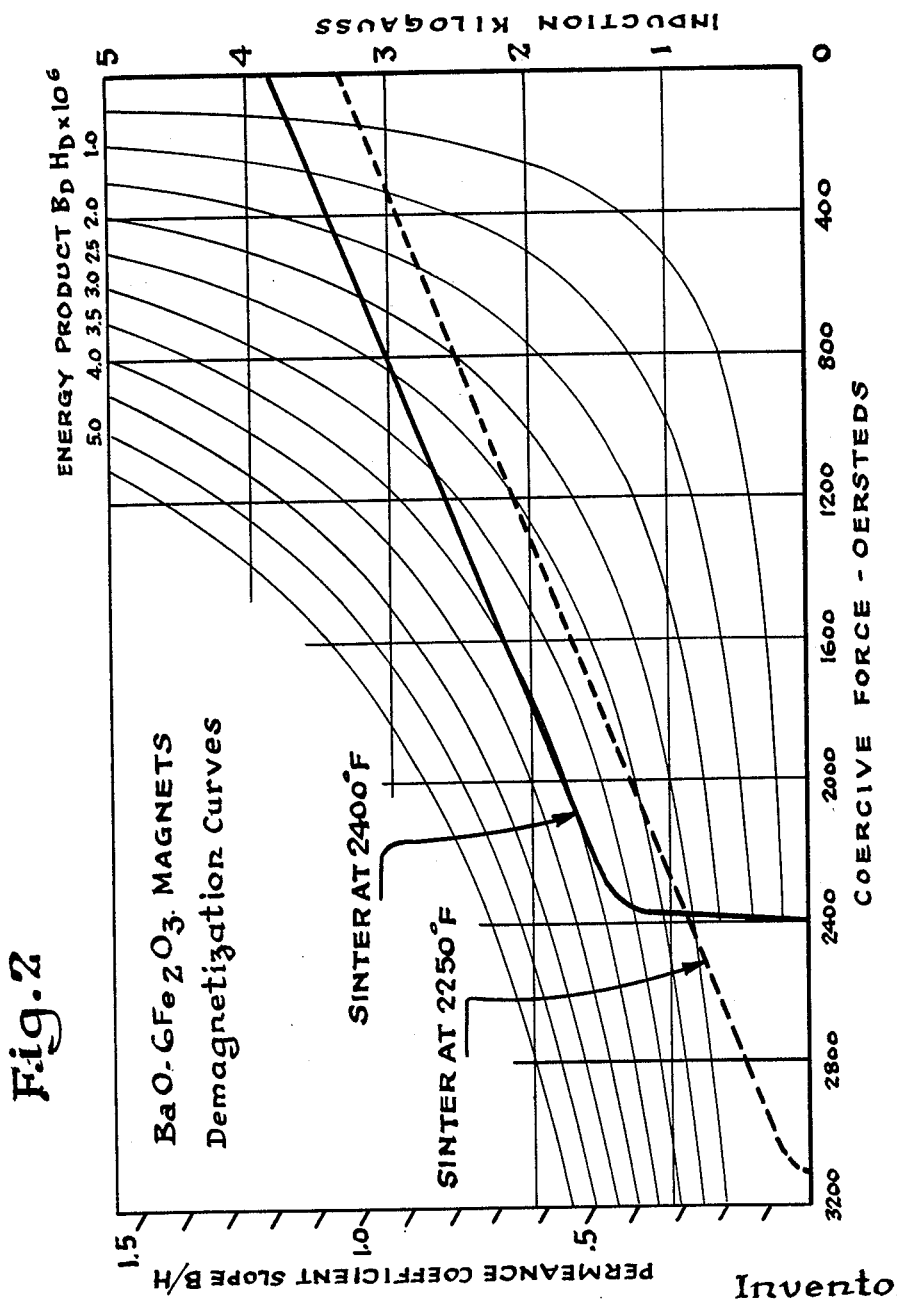

United States Patent Office 3,155,623
Patented Nov. 3, 1964

3,155,623
METHOD FOR MAKING BARIUM FERRITE MAGNETS
Robert H. Erickson, St. Clair Shores, Mich., and Sol Boyk, Toledo, Ohio, assignors to General Magnetic Corporation, Detroit, Mich., a corporation of Illinois
Filed Aug. 22, 1962, Ser. No. 218,577
6 Claims. (Cl. 252—62.5)

This invention relates to magnets of the ferrite type and in particular to magnets produced by pressing and sintering barium ferrite (BaO·6Fe$_2$O$_3$) while in a finely divided state. This application is a continuation-in-part of application Serial No. 138,808, filed September 18, 1961, now abandoned.

Magnetic ferrites are known to possess crystalline structure, and the distribution of the bivalent metal ions and ferric metal ions in the available spaces among the oxygen atoms in the crystal lattice is what determines the magnetic properties of the ferrite.

The commonly practiced method for the production of barium ferrite magnets is to first mill particles of barium carbonate and ferric iron oxide together to a fine state of subdivision. Thereafter a homogeneous mixture of the milled particles in the stoichiometric amount required for BaO·6Fe$_2$O$_3$ is prepared, and finally the mixture is calcined to transform the barium carbonate to barium oxide with concomitant in-situ formation of barium ferrite. The calcined product is then milled to a fine state of subdivision to obtain BaO·6Fe$_2$O$_3$ in powdered form.

The present invention departs significantly from such accepted procedures, and practices in accordance with the present invention result in magnets having superior characteristics in comparison to those of the prior art.

In accordance with the present invention, barium ferrite magnets are possible having an energy product in excess of 3.5×10$^6$, and barium ferrite magnets are possible which require a coercive force of nearly 3100 oersteds with a corresponding energy product of 2.75×10$^6$. In both instances, the "knee" of the demagnetization curve is well to the left of the maximum energy point, which means that the magnet can be exposed to higher demagnetizing influences without becoming demagnetized in comparison to a magnet where the knee is less to the left.

The production of barium ferrite magnets having the above-noted properties is the primary object of the present invention, and a related object of the present invention is to produce such magnets by what can be visualized as a chemical mixing of barium carbonate and iron oxide, in contradistinction to the mechanical mixing of these materials as heretofore practiced as a preliminary step to the production of barium ferrite. Specifically in this connection, it is an object of the present invention to precipitate barium carbonate molecules directly on ferric oxide particles dispersed in an aqueous medium, substantially in the stoichiometric proportions required for the ultimate formation of BaO·6Fe$_2$O$_3$.

Barium ferrite magnets produced under the present invention are characterized by barium ferrite powders obtained by calcining a slurry comprising barium carbonate formed in-situ on ferric oxide particles. This is an ideal contact obtained by dissolving barium hydroxide in water and establishing therein a dispersion of fine particle size ferric oxide. Thereafter, the mixture is charged with carbon dioxide which results in barium carbonate molecules condensing on the iron oxide particles that are present.

By proceeding in the above-outlined manner, there is obtained a degree of homogeneity and contact between iron oxide and barium carbonate that cannot possibly be achieved by mechanically mixing barium carbonate and ferric oxide particles for any practical length of time. Resultantly, the slurry product to be calcined $$(BaCO_3—Fe_2O_3—H_2O)$$

is one wherein the environment at any neighborhood is quite close to the ideal purity required for the production of magnetic barium ferrite crystals. In contrast, the prior art mechanically-mixed system of barium carbonate and ferric oxide, if randomly selected finite neighborhood portions thereof be counted, would display a probability cross-section characterized by certain neighborhoods being rich in barium carbonate and other neighborhoods being rich in iron oxide, representing departures from the ideal stoichiometric condition required to produce ideally BaO·6Fe$_2$O$_3$ crystals. In other words, excess iron oxide and excess barium oxide, uncombined in barium ferrite crystals, would be included in the end product, diluting the magnetic material and causing a loss of strength.

It is believed that the situation thus contrasted between the present practice and that of the prior art is responsible for the enhanced properties of magnetic materials obtained under the present invention. The contrast is perhaps made more understandable by observing that (1) an aqueous system consisting of supramicroscopic iron oxide particles (containing many submicroscopic molecules of Fe$_2$O$_3$) each enveloped by a submicroscopic continuum of in-situ formed barium carbonate molecules is quite different from (2) a system consisting of supramicroscopic particles of barium carbonate mixed in contact with supramicroscopic particles of iron oxide. In the former system (1) envelopment of iron oxide is substantially complete due to the barium carbonate continuum, such that barium ferrite crystals can form quite near to ideal conditions uniformly throughout the system. In the latter system (2) there is no envelopment, but rather a particle-to-particle contact, and there can be no guarantee of uniformity throughout the system.

It has been found also that barium ferrite magnets can be obtained having approximately a ten percent better coercive force, over and above what is otherwise possible under the present invention, by introducing finely divided colloidal silica into the mixer where the iron oxide and barium hydroxide are mixed.

Other and further objects of the present invention will be apparent from the following description and the claims which set forth preferred embodiments of the invention and the principles thereof and what is now considered to be the best modes contemplated for applying those principles. Other embodiments embodying the same or equivalent principles may be used and changes may be made as desired by those skilled in the art without departing from the present invention and the purview of the appended claims.

In the drawings:

FIG. 1 is a flow chart showing the various stages of manufacture of barium ferrite particles under the present invention; and FIG. 2 is a graph of magnetic properties of magnets produced under the present invention.

The following is a method for producing magnetic barium ferrite under the present invention.

*Example I*

| Material: | Amount, lbs. |
|---|---|
| Iron oxide (Fe$_2$O$_3$) | 300 |
| Barium hydroxide (Ba(OH)$_2$·8H$_2$O) | 120 |
| Water | 500 |

The above materials are brought together in an upright mixing tank denoted by reference character 10 in FIG. 1. The iron oxide particles are selected as having a predominant particle size of 0.4 to 2.6 microns. The barium hydroxide is water soluble. The molecular proportion of iron oxide $Fe_2O_3$, to BaO is about 4.95, manifesting an excess of barium hydroxide for forming the barium ferrite material. After mixing for a period of time predetermined as establishing a homogeneous system of iron oxide particles in water containing barium hydroxide, carbon dioxide is bubbled through the aqueous system until a pH of about 9 is observed, indicating that the conversion of barium hydroxide to barium carbonate is complete in accordance with the following formula:

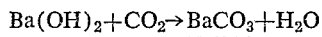

The barium hydroxide as noted dissolves, and hence this phenomenon assures that the iron oxide particles in effect will be in intimate contact with $Ba(OH)_2$ during the formation of in-situ $BaCO_3$ which is insoluble, noting that the iron oxide particles are also insoluble and are held in suspension in the aqueous solution by propeller action used to maintain the slurry at a uniform consistency in the mixing tank. The iron oxide in other words is in a matrix or atmosphere charged with barium carbonate reactants. Hence, when the above reaction is taking place, there occurs in effect a condensation of water insoluble barium carbonate molecules (as envelopes or films or like continuums) on the iron oxide particles, resulting in a condition close to the ideal chemical environment needed for the formation of clean, near-perfect barium ferrite crystals.

When a pH of about 9 is detected, the precipitation of barium carbonate is considered to be stoichiometrically complete, although it may be noted that an excess of barium hydroxide over the stoichiometric amount is used. Consequently, the aqueous slurry in the tank containing the iron oxide-barium carbonate particles is pumped to an inclined rotary kiln 12, FIG. 1, having a pump and speed that dictates a flow time of 1 to 2 hours for a given amount of the slurry through the kiln.

Approximately 200 to 300 pounds per hour of the slurry are pumped into the kiln and clinkers of hard barium ferrite are discharged at the lower end of the kiln. The kiln is gas fired to have a temperature of about 1800 to 2400° at the lower end and 700 to 1200° F. at the bottom of the stack. In the kiln the following calcination occurs:

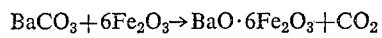

The barium ferrite clinkers discharged from the kiln are transported by an inclined Archimedean screw to an impacting mill 14 at an elevated level where these relatively hard clinkers, which on an average are about ½ inch in diameter, are reduced to a particle size of 20 microns or less.

The dry product reduced in the mill is then transported to a ball mill 15. Here, it is introduced into the mill in the form of a 50% by weight water slurry, and the barium ferrite particles are ground to about one micron average diameter.

The resultant slurry contains barium ferrite in a fine suspension, and this slurry is pumped to a stand tank 16 where the barium ferrite is permitted to settle as a mud. The supernatant liquid, essentially water containing a small amount of dissolved barium hydroxide is drained off. The barium ferrite mud is discharged into barrels for shipment (Product A, FIG. 1). This wet product will be used for oriented magnets. The barium ferrite mud can also be dried in a spray tower 13, FIG. 1, resulting in fine, dry powders (Product B) to be used for unoriented magnets.

In producing oriented magnets under the present invention, predetermined amounts of the barium ferrite slurry obtained by decanting the product from the ball mill (Product A) are pressed to a high state of density in a magnetic field which establishes the desired field orientation, a pressure of approximately three tons per square inch being used. It will be appreciated that such compaction takes place in a die cavity having the geometry desired for the finished magnet, and after compaction has been completed, the pressed bodies having oriented barium ferrite crystals are transferred to a sinter oven where they are sintered for 30 to 90 minutes (net) at temperatures which have an effect on the ultimate magnetic properties as will be noted hereinafter. These time and temperature relationships primarily determine mechanical properties such as hardness and the like, but it may be mentioned that the sintering temperatures employed will vary from approximately 2200 to 2450° F. The total furnace cycle will vary from 6 to 20 hours since the magnets as pressed are to be brought up to the sintering temperature and are thereafter to be cooled to room temperature without unduly stressing or causing the same to crack.

If unoriented magnets are desired, then predetermined amounts of dry powders obtained in the spray tower abovementioned (Product B) are pressed in a die cavity while employing pressures of approximately six tons per square inch, and thereafter the compacted bodies are sintered under conditions similar to those disclosed above for oriented magnets.

Referring to FIG. 2, this is a graph containing the demagnetization portions of hysteresis loops of barium ferrite magnet bodies produced under the present invention. Exceptional values in energy products are obtained in oriented products sintered at 2400° F., namely, $3.6 \times 10^6$. Additionally, magnetic bodies having unusually high resistance to demagnetization are obtained by sintering at 2250° F. In brief, the ferrite products of the present invention will exhibit considerable increase in coercive force for any given maximum energy product in comparison to the best barium ferrite magnets presently known in the prior art. These properties and the other advantageous relationships noted are due to the unique manner in which barium carbonate and iron oxide are associated, preliminary to calcining, by what we classify as chemical mixing as distinguished from the mechanical methods heretofore used for producing an intimate association between barium carbonate and iron oxide.

Approximately a 10% improvement in coercive force in the magnets of the present invention above described can be realized by adding colloidal silica to the aqueous mixture in the carbonating tank containing iron oxide and barium hydroxide, processing thereafter being identical to what has been described above. The following is a typical example.

*Example II*

| Material: | Amount, lbs. |
|---|---|
| Iron oxide ($FE_2O_3$) | 3000 |
| Barium hydroxide monohydrate | 680 |
| Colloidal silica [1] | 60 |

[1] Sold as Nalcoag 1030 by National Aluminate Corporation analyzing 30% by weight colloidal silica solids and having a specific gravity at 68° F. of 1.205.

The above ingredients are added to the mixing tank, where barium carbonate is to be formed, in the order of iron oxide, barium hydroxide monohydrate and colloidal silica to 5400 lbs. of water. This mixture is then agitated and carbonated. A typical analysis of the slurried material shows a solid content of 40% of which 80% is iron oxide, 19.5% barium hydroxide monohydrate and 0.5% silica. The analysis on a molar basis of $Fe_2O_3$:BaO is about 5.25.

The slurried material is carbonated (by bubbling carbon dioxide therethrough) for a period of approximately three hours, and during this time the pH decreases from approximately 12.5 to approximately 9.5 indicating complete conversion to barium carbonate.

The slurry containing the carbonate is then ready to be fed to the rotating kiln where it is fired at an average high temperature of about 2250° F. at a rate through the kiln of approximately 250 lbs. per hour.

It will be realized that while the preferred embodiments of the present invention have been described, such are capable of variation and modification as desired by those skilled in the art, and we therefore do not wish to be limited to the precise details set forth, but desire to avail ourselves of such changes and alterations as fall within the purview of the following claims.

We claim:

1. A method of preparing barium ferrite comprising precipitating barium carbonate from an aqueous solution of barium hydroxide on to ferric oxide particles substantially in the molecular ratio of at least one molecular weight of barium carbonate for every six molecular weights of ferric oxide, and calcining the resulting product to produce $BaO \cdot 6Fe_2O_3$.

2. A method of preparing barium ferrite for permanent magnet production characterized by an intimate chemically developed union between iron oxide particles and barium oxide particles and comprising, preparing an aqueous slurry of a predetermined amount of ferric oxide and barium hydroxide, the barium hydroxide being stoichiometrically in excess of that required for the production of $BaO \cdot 6Fe_2O_3$, charging the aqueous system with carbon dioxide to precipitate barium carbonate molecules on the iron oxide particles in the slurry, calcining the slurry at a temperature of about 1800–2400° F. to remove water and to transform the barium carbonate to barium oxide resulting in $BaO \cdot 6Fe_2O_3$, and mechanically reducing the calcined product to obtain barium ferrite particles of the desired size for producing permanent magnets.

3. A method according to claim 2 wherein the aqueous slurry contains finely divided colloidal silica.

4. A method of preparing barium ferrite for permanent magnet production characterized by an intimate union between iron oxide particles and barium oxide particles and comprising, preparing an aqueous slurry of ferric oxide and barium hydroxide approximately in amounts corresponding to the molecular ratio of $Fe_2O_3$:BaO of about 5:1 manifesting an excess of barium hydroxide, introducing carbon dioxide into the slurry to precipitate, barium carbonate in a molecular state on the iron oxide particles in the slurry at least in the stoichiometric relation required for the production of $BaO \cdot 6Fe_2O_3$, calcining the slurry at a temperature of about 1800–2400° F. to remove water and to transform the barium carbonate to barium oxide resulting in $BaO \cdot 6Fe_2O_3$, and mechanically reducing the calcined product to obtain barium ferrite particles of the desired size for producing permanent magnets.

5. A method of producing a magnetizable body composed of sintered $BaO \cdot 6Fe_2O_3$ particles comprising, precipitating barium carbonate from barium hydroxide directly on to ferric oxide particles in an aqueous medium and calcining the product to obtain barium ferrite $BaO \cdot 6Fe_2O_3$, milling the calcined product to obtain powdered barium ferrite, and pressing and sintering the barium ferrite powders to afford said body.

6. A method of producing a magnetizable body composed of sintered $BaO \cdot 6Fe_2O_3$ particles comprising, precipitating barium carbonate from barium hydroxide directly on to ferric oxide particles in the presence of colloidal silica in an aqueous medium and calcining the product to obtain barium ferrite $BaO \cdot 6Fe_2O_3$, milling the calcined product to obtain powdered barium ferrite, and pressing and sintering the barium ferrite powders to afford said body.

References Cited by the Examiner
UNITED STATES PATENTS

| 2,980,617 | 4/61 | Ireland | 252—62.5 |
| 3,001,943 | 9/61 | Sixtus | 252—62.5 |

MAURICE A. BRINDISI, *Primary Examiner.*